(12) United States Patent
Helm

(10) Patent No.: US 10,414,274 B2
(45) Date of Patent: Sep. 17, 2019

(54) CHANNEL SELECTION INTERFACE FOR A VEHICLE

(71) Applicant: Toyota Motor Engineering & Manufacturing North America, Inc., Erlanger, KY (US)

(72) Inventor: Sean L. Helm, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 885 days.

(21) Appl. No.: 14/554,285

(22) Filed: Nov. 26, 2014

(65) Prior Publication Data

US 2016/0144715 A1 May 26, 2016

(51) Int. Cl.
| | |
|---|---|
| *G06F 3/0482* | (2013.01) |
| *G06F 3/0484* | (2013.01) |
| *B60K 35/00* | (2006.01) |
| *H04H 40/90* | (2008.01) |
| *G06F 3/0488* | (2013.01) |
| *B60K 37/06* | (2006.01) |

(52) U.S. Cl.
CPC .............. *B60K 35/00* (2013.01); *B60K 37/06* (2013.01); *G06F 3/0482* (2013.01); *G06F 3/04842* (2013.01); *G06F 3/04847* (2013.01); *G06F 3/04883* (2013.01); *G06F 3/04886* (2013.01); *H04H 40/90* (2013.01); *B60K 2350/106* (2013.01); *B60K 2350/1052* (2013.01)

(58) Field of Classification Search
CPC ........ B60K 35/00; B60K 37/00; B60K 37/02; B60K 37/04; B60K 37/06; G06F 3/0482; G06F 3/04842; G06F 3/04847
See application file for complete search history.

(56) References Cited

U.S. PATENT DOCUMENTS

| | | | |
|---|---|---|---|
| 6,057,831 A | 5/2000 | Harms et al. | |
| 6,486,896 B1 | 11/2002 | Ubillos | |
| 6,522,342 B1 * | 2/2003 | Gagnon | H04H 60/25 715/716 |
| 7,412,715 B2 | 8/2008 | Kim et al. | |
| 7,765,491 B1 | 7/2010 | Cotterill | |
| 7,765,568 B1 * | 7/2010 | Gagnon | H04H 60/25 715/787 |
| 8,571,465 B2 | 10/2013 | Eastman et al. | |
| 2005/0172230 A1 * | 8/2005 | Burk | G06F 3/0482 715/716 |

(Continued)

OTHER PUBLICATIONS

Brandao, "Review Android car stereo radio and navigation," Jan. 24, 2014, http://www.abrandao.com/2014/01/android-car-stereo-radio-and-gps/.*

(Continued)

*Primary Examiner* — Ryan Barrett
(74) *Attorney, Agent, or Firm* — Christopher G. Darrow; Darrow Mustafa PC

(57) ABSTRACT

Disclosed herein is inter alia a channel selection interface includes a plurality of sectors, each of the sectors including a number of tunable service identifiers divided by the plurality of sectors, and a plurality of channel markers that separate the plurality of sectors. The channel selection interface provides an even allocation of channels for a gesture recognition interface.

16 Claims, 2 Drawing Sheets

(56) References Cited

U.S. PATENT DOCUMENTS

| | | | | |
|---|---|---|---|---|
| 2007/0157126 | A1* | 7/2007 | Tschirhart | B60K 35/00 715/848 |
| 2009/0085880 | A1* | 4/2009 | Vitale | B60R 11/0264 345/173 |
| 2009/0293019 | A1* | 11/2009 | Raffel | G06F 3/04847 715/833 |
| 2010/0257484 | A1* | 10/2010 | Nakamura | G06F 17/30749 715/828 |
| 2012/0013548 | A1* | 1/2012 | Choi | B60K 35/00 345/173 |
| 2013/0205258 | A1* | 8/2013 | Ecker | B60K 35/00 715/822 |
| 2014/0139450 | A1* | 5/2014 | Levesque | G08B 6/00 345/173 |
| 2014/0267135 | A1* | 9/2014 | Chhabra | G06F 3/044 345/174 |
| 2016/0328244 | A1* | 11/2016 | Ahmed | G06F 9/4443 |

OTHER PUBLICATIONS

Brandao, "Review Toyota Camry Radio Navigation GPS Bluetooth Head Unit," Jul. 23, 2014, http://www.abrandao.com/2014/07/review-generic-toyota-camry-car-radio-navigation-head-unit/.*

* cited by examiner

CHANNEL SELECTION INTERFACE FOR A VEHICLE

BACKGROUND

The present disclosure relates to a vehicle infotainment system and, more particularly, to a system and method to organize and display channels for a satellite radio or other type of media.

Vehicles often include various systems such as infotainment and navigation systems. A user typically interfaces with such systems via a vehicle head unit located in a dashboard of a vehicle cabin. The infotainment system often includes services such as AM, FM, satellite radio, and other media.

While AM and FM have fixed operational frequencies set by the FCC, satellite radio (XM, Sirius, etc.) does not. XM, for example, has a fixed set of 384 tunable service identifiers that can be broadcast to receivers. A channel number (e.g., Channel 34 Lithium Radio) is assigned to a specific tunable service identifier. The channel number is the user facing channel indicator for the corresponding service indicator. Channel numbers can be from 0-999 but not every channel number necessarily has a corresponding service identifier.

SUMMARY

Described herein are a channel selection interface and a method for organizing and displaying satellite radio channels or other types of media channels (e.g., television channels). The channel selection interface includes a plurality of sectors and a number of tunable service identifiers for display by a vehicle head unit of a vehicle. The channel selection interface displays dynamically identified sectors of the spectrum of available channels and allocates channels within the sectors relatively evenly. This even distribution facilitates selection via a gesture recognition interface. The channel selection interface can be used within an automobile head unit.

A channel selection interface for a vehicle, according to one disclosed non-limiting embodiment, includes a plurality of sectors, each of the sectors including a number of tunable service identifiers divided by the plurality of sectors. A plurality of channel markers separates the plurality of sectors.

A head unit for a vehicle, according to one disclosed non-limiting embodiment, includes an interactive display system operable to display a satellite radio channel selection interface, the channel selection interface provides an even allocation of channels and a gesture recognition interface in communication with the interactive display system to select the desired channel.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Disclosed herein are a channel selection interface and a method that can be used with a satellite radio or other media system. In one non-limiting example, the channel selection interface operates via a gesture recognition interface, which allows a user to more easily locate a desired channel among the available channels to the user. The channel selection interface can be utilized to dynamically and evenly distribute available channels across a spectrum to minimize the opportunity for overshooting the desired channel during channel selection.

Figure 1:
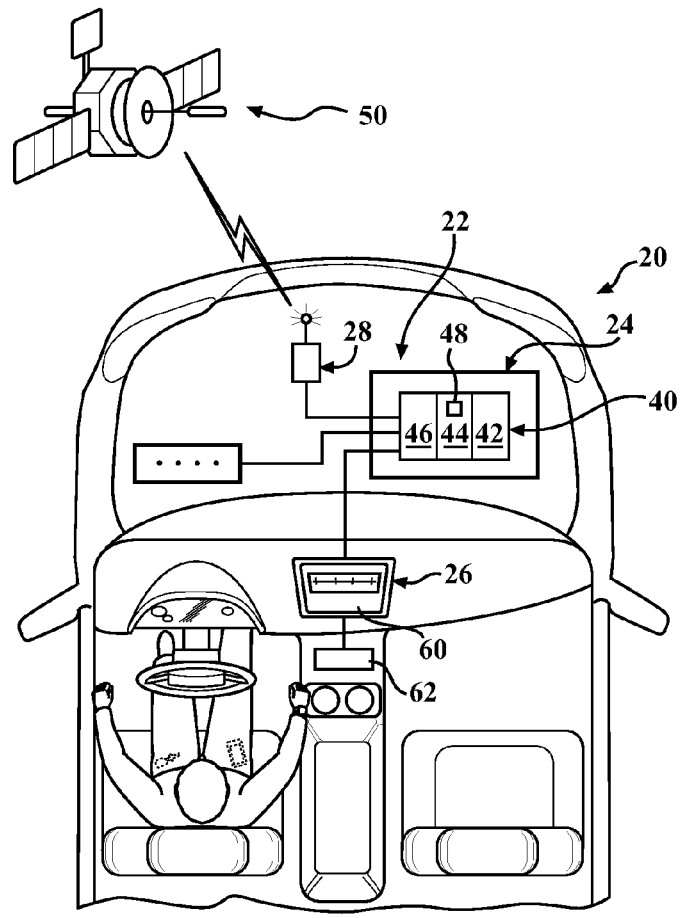
FIG. 1 is a schematic view of a vehicle system.

FIG. 1 schematically illustrates a vehicle 20 with a vehicle head unit 22. As will be further described, the vehicle head unit 22 is operable to display content that can include personalized information, entertainment content such as videos, games, maps, navigation, vehicle diagnostics, calendar information, weather information, vehicle climate controls, vehicle entertainment controls, email, internet browsing, or other interactive applications.

The vehicle head unit 22 can include a control system 24, an interactive display system 26, and a communication system 28. It should be appreciated that although particular systems are separately defined, each or any of the systems may be otherwise combined or separated via hardware and/or software.

The control system 24 can include a control module 40 with a processor 42, a memory 44, and an interface 46. The control module 40 may be a portion of a central vehicle control, a stand-alone unit, or other system such as a cloud-based system. Control algorithms and other operational software for the processor 42 may also be stored in the memory 44. The processor 42 may be any type of microprocessor with desired performance characteristics. The memory 44 may include any type of computer readable medium that stores the data and control algorithms described herein such as a channel selection interface algorithm 48.

The interface 46 facilitates communication with other systems such as the interactive display system 26 and the communication system 28. The interface 46 provides for communication and information exchange with on-board vehicle systems and off-board vehicle systems via the communication system 28. On-board systems include, but are not limited to, vehicle sensors that provide, for example, vehicle tire pressure, fuel level and other vehicle diagnostic information. Off-board vehicle systems include, but are not limited to, off-board content providers such as a satellite radio provider 50 (illustrated schematically). The satellite radio provider 50, in this disclosed non-limiting embodiment, communicates with the vehicle head unit 22 via the communication system 28.

The interactive display system 26 includes a display 60 and a user interface 62 located within a vehicle cabin for driver and front passenger access. The user interface 62, in this example, may include, but not be limited to, a touch pad, roller, wireless device, smartphone, hand motion recognition system, or other gesture recognition interfaces. Alternatively, or in addition thereto, the display 60 can combine at least some of the interface into a touch panel display which may also be "swiped" and/or respond to other gestures by the user.

Figure 2:
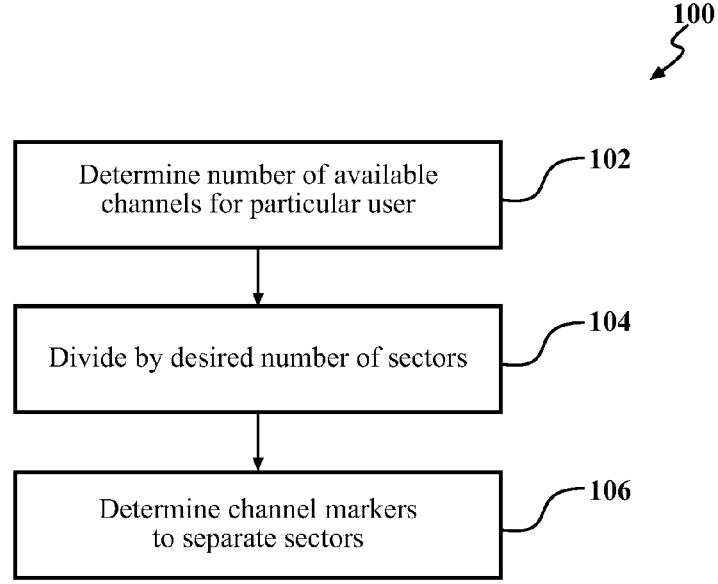
FIG. 2 is a flow chart illustrating operations of the vehicle system according to one disclosed non-limiting embodiment.
Figure 3:
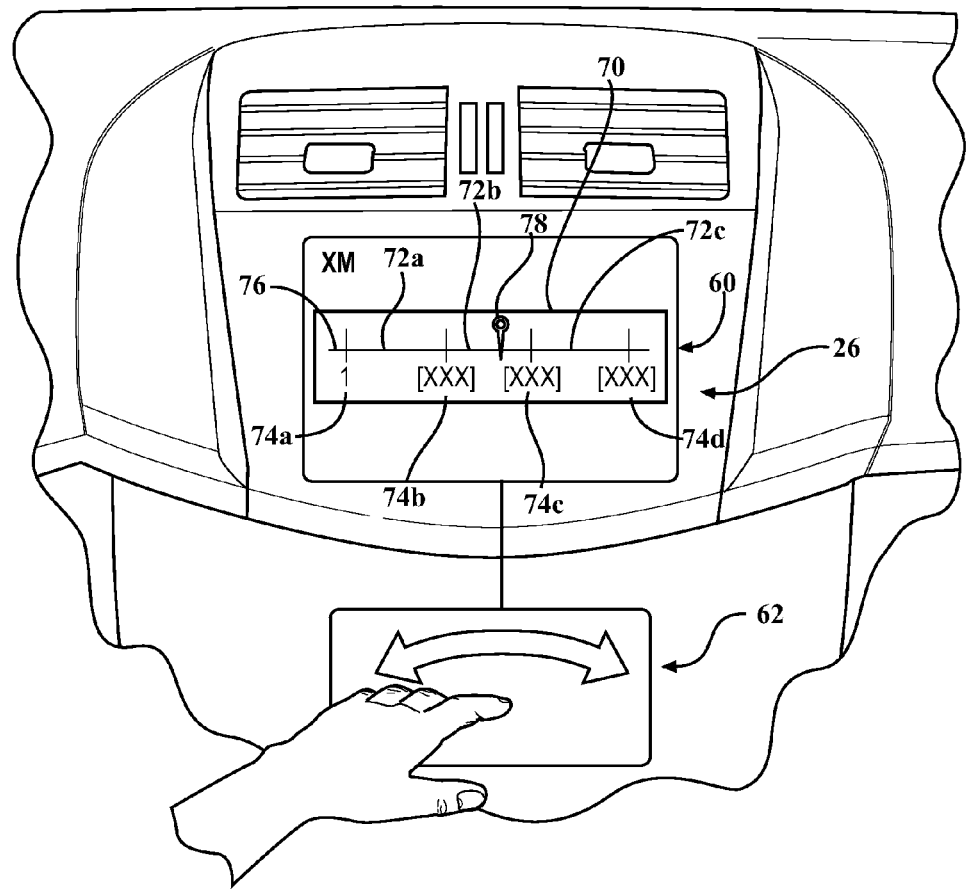
FIG. 3 is a symbology page on a vehicle head unit illustrating an interface for satellite radio according to one disclosed non-limiting embodiment.
Figure 4:
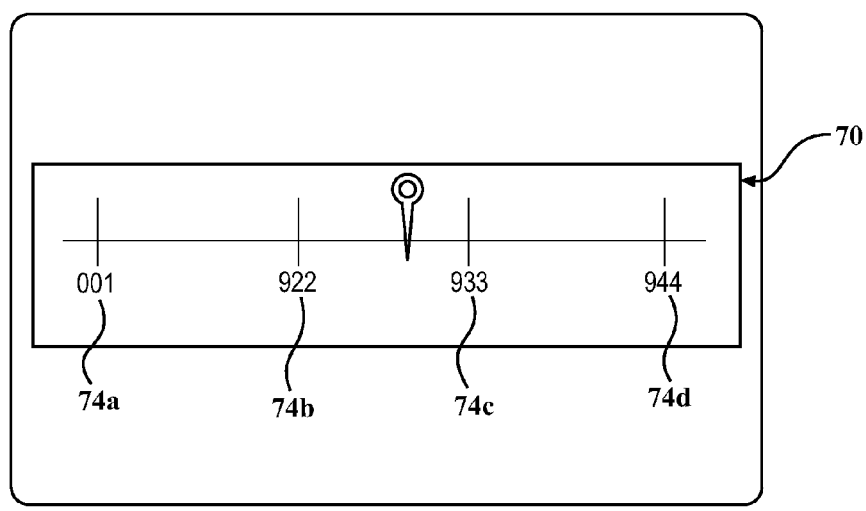
FIG. 4 is a symbology page on a vehicle head unit illustrating a specific interface for satellite radio according to one disclosed non-limiting embodiment.

The functions of the algorithm 48 are disclosed in terms of functional block diagrams in FIG. 2 and representative symbology in FIGS. 3 and 4. It should be appreciated that these functions may be enacted in either dedicated hardware circuitry or programmed software routines capable of execution in a microprocessor based electronics control embodiment. That is, the memory 44 is an example computer storage media having embodied thereon computer-useable instructions such as the algorithm 48 that, when executed, performs a method 100 to evenly distribute available satellite channels for display as a channel selection interface 70 on the vehicle interactive display system 26 to improve a human machine interface experience when selecting a station through the user interface 62.

With reference to FIG. 2, the method 100, according to one disclosed non-limiting embodiment, initially determines the number of available channels for the particular user (step 102). That is, each user typically subscribes to a particular package with particular predetermined channels such as Channel 001, Guide; Channel 004, 40s on 4; Channel 008, 80s on 8; Channel 009, 90s on 9; Channel 034, Lithium Radio, Channel 061; Bluegrass Junction; Channel 063, The Message; Channel 068, Spa; Channel 076, Symphony Hall; and Channels 920-944, Sports, i.e., channels that use thirty-three (33) tunable service indicators.

The number of available channels for the particular user may be determined dynamically upon some set time interval. For example, each time the vehicle is started, the list of available channels that are broadcast matching the current service package the user is subscribed to is acquired and assigned their respective tunable service identifiers (for example, 1 to 383) which are not displayed on the channel selection interface 70 (FIG. 3). That is, as satellite service identifiers often change, "dynamic" distribution will maintain the desired relationship. In other words, "dynamic" distribution adjusts to be current based on a user's satellite service subscription.

Next, the total number of tunable service identifiers is divided by a plurality of sectors (step 104). The channel selection interface 70, in this example, includes a plurality of sectors (three shown) 72a 72b, 72c that are defined by a plurality of channel markers (four shown) 74a, 74b, 74c, 74d (FIG. 3). This exemplary method evenly allocates channels within the sectors 72a, 72b, and 72c and between channel markers 74a, 74b, 74c, 74d to facilitate operation of the gesture recognition user interface 62.

In one disclosed non-limiting embodiment, the channel selection interface 70 may be graphically rendered as a bar 76, upon which a selection slider 78 is moved along the plurality of sectors 72a 72b, 72c (FIG. 3). The plurality of channel markers 74a, 74b, 74c, 74d provide a frame of reference for the user.

In this simplified example, there are thirty-three (33) tunable service indicators so each sector contains eleven (11) tunable service identifiers. It should be appreciated that various rounding techniques may be utilized should the quotient not be a whole number. Each of these thirty-three (33) channels has a corresponding tunable service indicator between 1-383, which are designated by the satellite radio provider but not displayed to the user. ¦ cgdarrow1]

Dynamically and evenly distributing available channels across the spectrum of available channels for each customer service package will minimize the opportunity for overshooting the desired channel during the selection process. For example, were all the channels jammed into a small portion of the selectable range would result in very small separations that may complicate effective selection while driving. The channel markers 74a, 74b, 74c, 74d also permit a user to "jump" to the desired channel markers 74a, 74b, 74c, 74d through a desired motion such as a double tap, quick swipe or other gesture on the gesture recognition user interface 62.

Next, the appropriate channel markers 74a, 74b, 74c, 74d are selected to separate the sectors 72a 72b, 72c (step 106). That is, each channel markers 74a, 74b, 74c, 74d is the corresponding channel number (001, 002, 003, . . . , 999) for the total number of tunable service identifiers divided by three (3) (FIG. 4). In other words, the number of tunable service identifiers is the dividend, and the number of sectors is the divisor (3 in this example) such that the number of tunable service identifiers in each sector is the quotient. Typically, channel marker 74a is "001" (the first channel marker which is almost always 001, however, other channel numbers which are the lowest selectable may be the first channel marker 74a); 74B is 1X (the channel marker is the corresponding channel at 1X where X is the quotient); 74C is 2X (the channel marker is the corresponding channel at 2X where X is the quotient); and 74D is 3X (the last tunable channel for that subscriber). That is, the plurality of channel markers 74a, 74b, 74c, 74d bound each of the plurality of sectors 72a 72b, 72c.

In this simplified example, the displayed channel markers 74a, 74b, 74c, 74d would be Channel 001, Guide; Channel 922 Sports; Channel 933 Sports; Channel 944 Sports (FIG. 4). Notably, because of the preponderance of "sports" channels that range from 920-944 in the subscriber's package, the available channels are biased toward the higher channels (irrespective of their service identifiers); thus, the channels for this user are evenly distributed across the gesture recognition user interface 62. With the available channels evenly distributed, the gesture recognition on the gesture recognition user interface 62 will have a generally consistent rate of distance between channels while the user swipes left and right to find the desired channel.

Dynamically identifying sectors of the spectrum of available channels for satellite radio facilitates allocation of channels within the channel markers relatively evenly to facilitate operation of the gesture recognition user interface 62. Dynamically and evenly distributing available channels across the spectrum will thus minimize the opportunity for overshooting the desired channel during channel selection.

Without dynamic allocation based on available channels, there would be a risk of labeling the sectors with a non-selectable channel as well as not being able to evenly allocate channels. This would potentially lead to a situation where a significantly higher number of channels might exist in a given sector and gesture recognition to a given channel would not be consistent and may result in user frustration. In other words a small movement in one sector or a large movement in a different sector might accomplish the same task, or the visual feedback (speed of the cursor) would be inconsistent.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. A channel selection system for a vehicle, comprising:
 a vehicle; and
 a processor onboard the vehicle, the processor being configured to:
  determine a number of available channels for a user, each of the available channels having an associated channel number;
  divide the determined number of available channels for the user by a predetermined number of sectors, whereby an even allocation of available channels within the sectors is determined, the predetermined number of sectors being a whole number that is less than the number of available channels, the predetermined number of sectors being fixed;
  determine a plurality of channel markers, the channel markers separating the predetermined number of sectors, each of the channel markers corresponding to a channel number of one of the available channels, a numerical gap between the channel numbers of a first pair of neighboring channel markers being different than a numerical gap between the channel numbers of a second pair of neighboring channel markers, each of the plurality of channel markers bounding at least one of the sectors; and
  cause a graphical representation of a channel selector to be presented on a display located in a cabin of the vehicle for driver and front passenger access, the channel selector including the plurality of channel markers, the available channels being evenly distributed across the predetermined number of sectors, a plurality of channels being associated with each sector.

2. The channel selection system as recited in claim 1, wherein the predetermined number of sectors includes four sectors.

3. The channel selection system as recited in claim 2, wherein the plurality of channel markers includes four channel markers.

4. The channel selection system as recited in claim 1, wherein each of the plurality of channel markers are represented by a channel number.

5. The channel selection system as recited in claim 1, wherein each of the plurality of channel markers are represented by a corresponding channel number for an associated tunable service identifier for satellite radio.

6. A system for a vehicle, comprising:
 a vehicle;
 a processor located onboard the vehicle, the processor being configured to:
  determine a number of available satellite radio channels for a user, each of the available satellite radio channels having an associated channel number;
  divide the determined number of available satellite radio channels for the user by a predetermined number of sectors, whereby an even allocation of available satellite radio channels within the sectors is determined, the predetermined number of sectors being a whole number that is less than the number of available channels, the predetermined number of sectors being fixed; and
  determine a plurality of channel markers to separate the sectors, the channel markers corresponding to the channel number of one of the available satellite radio channels; and
 a display located onboard the vehicle for driver and front passenger access, the display being operatively connected to the processor, the processor being further configured to:
  cause a satellite radio channel selector to be presented on the display, the satellite radio channel selector including the plurality of channel markers, the available channels being evenly distributed across the predetermined number of sectors, each of the channel markers being represented by one of: a corresponding channel number or a channel number for an associated tunable service identifier, a numerical gap between the channel numbers of a first pair of neighboring channel markers being different than a numerical gap between the channel numbers of a second pair of neighboring channel markers, a plurality of channels being associated with each sector, each of the plurality of channel markers bounding at least one of the sectors.

7. The system as recited in claim 6, wherein each of the sectors includes a number of tunable service identifiers divided by the number of sectors in the plurality of sectors.

8. The system as recited in claim 7, wherein the channel selection interface includes a plurality of channel markers which separate the plurality of sectors.

9. The system as recited in claim 8, wherein the predetermined number of sectors includes three sectors.

10. The system as recited in claim 9, wherein the plurality of channel markers includes four channel markers.

11. The system as recited in claim 6, further including a touch pad or a touch screen operatively connected to the processor, whereby a user interacts with the satellite radio channel selector via the touch pad or touch screen.

12. The system as recited in claim 11, wherein a swiping motion on the touch pad or the touch screen is utilized to select a desired channel.

13. The system as recited in claim 11, wherein a motion on the touch pad or the touch screen is utilized to select one of a plurality of channel markers that separate the predetermined number of sectors.

14. The system as recited in claim 11, wherein the satellite radio channel selector is rendered as a bar.

15. The system as recited in claim 14, wherein a selection slider is moved along the bar in response to a gesture on the touch pad or the touch screen.

16. A satellite radio channel selection system for a vehicle, comprising:
   a vehicle;
   a display located onboard the vehicle, the display being a part of a vehicle head unit located in a cabin of the vehicle;
   a processor located onboard the vehicle, the processor being operatively connected to the display, the processor being configured to:
      determine a number of available satellite radio channels for a user, each of the available satellite radio channels having an associated channel number;
      divide the determined number of available satellite radio channels for the user by a predetermined number of sectors, whereby an even allocation of available satellite radio channels within the sectors is determined, the predetermined number of sectors being a whole number that is less than the number of available channels, the predetermined number of sectors being fixed;
      determine a plurality of channel markers to separate the sectors, the channel markers corresponding to the channel number of one of the available satellite radio channels; and
      cause a satellite radio channel selector to be presented on the display, the satellite radio channel selector including the plurality of channel markers, the available channels being evenly distributed across the predetermined number of sectors, each of the channel markers being represented by one of: a corresponding channel number or a channel number for an associated tunable service identifier, a numerical gap between the channel numbers of a first pair of neighboring channel markers being different than a numerical gap between the channel numbers of a second pair of neighboring channel markers, a plurality of channels being associated with each sector, each of the plurality of channel markers bounding at least one of the sectors; and
   a user interface located in a cabin of the vehicle for driver and front passenger access, the user interface being operatively connected to the processor, the user interface being configured to receive user inputs to cause a satellite radio channel tuner selector to select a desired channel or channel marker, the user interface including a touch pad, a touch screen, or a roller.

* * * * *